US009901211B2

(12) United States Patent
Balcerzak et al.

(10) Patent No.: US 9,901,211 B2
(45) Date of Patent: Feb. 27, 2018

(54) BARBECUE SUPPORT ASSEMBLY

(71) Applicants:Stephen Balcerzak, Waterloo (CA);
Walter Grassi, Burlington (CA);
Marilyn Bowden, Chicago, IL (US);
Daniel Pelletier, Beach Park, IL (US)

(72) Inventors: Stephen Balcerzak, Waterloo (CA);
Walter Grassi, Burlington (CA);
Marilyn Bowden, Chicago, IL (US);
Daniel Pelletier, Beach Park, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 1023 days.

(21) Appl. No.: 13/892,636

(22) Filed: May 13, 2013

(65) Prior Publication Data

US 2013/0247898 A1    Sep. 26, 2013

Related U.S. Application Data

(63) Continuation-in-part of application No. 12/889,891, filed on Sep. 24, 2010, now Pat. No. 8,881,645.

(60) Provisional application No. 61/245,775, filed on Sep. 25, 2009.

(51) Int. Cl.
*A47J 37/04* (2006.01)
*A47J 37/07* (2006.01)

(52) U.S. Cl.
CPC .... *A47J 37/0786* (2013.01); *A47J 2037/0795* (2013.01)

(58) Field of Classification Search
CPC .... A22C 17/006; A22C 17/0066; A47J 33/00; A47J 36/26; A47J 37/049; A47J 37/07; A47J 37/0781; A47J 37/0786; A47J 2037/0777; A47J 2037/0795; A47J 43/18
USPC .......................................................... 99/419
See application file for complete search history.

(56) References Cited

U.S. PATENT DOCUMENTS

| 3,169,470 A | 2/1965 | Oatley |
| 3,309,982 A | 3/1967 | Surks |
| 3,481,267 A | 12/1969 | Saiki |
| 3,590,726 A | 7/1971 | Warner |
| 4,324,174 A | 4/1982 | Conradt |
| 4,413,609 A | 11/1983 | Tisdale |

(Continued)

FOREIGN PATENT DOCUMENTS

| FR | 2468346 A2 | 5/1981 |
| FR | 2489132 A1 | 3/1982 |

OTHER PUBLICATIONS

Partial European Search Report in EP14167890.4 dated Nov. 6, 2014.

(Continued)

*Primary Examiner* — Dana Ross
*Assistant Examiner* — Brandon Harvey
(74) *Attorney, Agent, or Firm* — Vitale Vickery Niro & Gasey

(57) ABSTRACT

A barbecue support assembly for supporting an elongate skewer or other accessories at one or more preselected heights above a barbecue grill. The barbecue support assembly includes one or more body elements having one or more parts thereof positionable substantially at one of the preselected heights. Also the part includes one or more apertures in which an end of the skewer is receivable. A rotatable and removable leg assembly is also provided.

9 Claims, 16 Drawing Sheets

(56) References Cited

U.S. PATENT DOCUMENTS

| | | | |
|---|---|---|---|
| 4,433,671 A * | 2/1984 | DeAmicis | F24B 1/205 126/25 A |
| 4,488,535 A | 12/1984 | Johnson | |
| 4,559,869 A * | 12/1985 | Hogan | A47J 37/0694 211/184 |
| 4,598,690 A | 7/1986 | Hsu | |
| 4,724,753 A | 2/1988 | Neyman | |
| 4,932,390 A | 6/1990 | Ceravolo | |
| 4,979,437 A | 12/1990 | Giebel | |
| 5,085,203 A | 2/1992 | Jette | |
| 5,105,726 A | 4/1992 | Lisker | |
| 5,419,249 A | 5/1995 | Papandrea | |
| 5,518,127 A | 5/1996 | Warmack | |
| 5,650,085 A | 7/1997 | Chen | |
| 5,927,267 A | 7/1999 | McKenzie | |
| 6,142,140 A | 11/2000 | Shumaker | |
| 6,308,616 B1 | 10/2001 | Johnson | |
| 6,439,109 B1 | 8/2002 | Rehill | |
| 6,474,224 B1 | 11/2002 | Natter | |
| 6,640,797 B1 | 11/2003 | Magers | |
| 7,000,529 B2 | 2/2006 | Sculuca | |
| 7,040,219 B1 | 5/2006 | D'Amato | |
| 7,281,469 B1 | 10/2007 | Barbour | |
| 2003/0051607 A1 | 3/2003 | Cassell | |
| 2005/0257693 A1 | 11/2005 | Tschetter | |
| 2005/0279223 A1* | 12/2005 | McPeak | A47J 43/18 99/419 |
| 2006/0124567 A1 | 6/2006 | Bove | |
| 2007/0151465 A1 | 7/2007 | Sculuca | |
| 2008/0053425 A1 | 3/2008 | Stuhlmacher | |
| 2008/0216809 A1* | 9/2008 | Begotka | F24C 1/16 126/30 |
| 2010/0294907 A1* | 11/2010 | Kocher | A47J 33/00 248/413 |
| 2011/0113974 A1 | 5/2011 | D'Amato | |

OTHER PUBLICATIONS

Extended European Search Report and Written Opinion in EP14167890.4 dated Nov. 13, 2014.

* cited by examiner

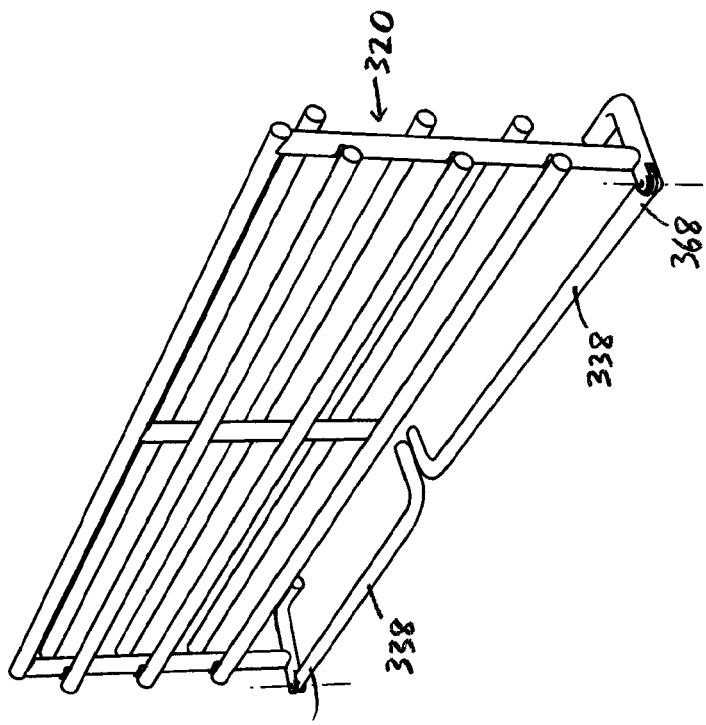
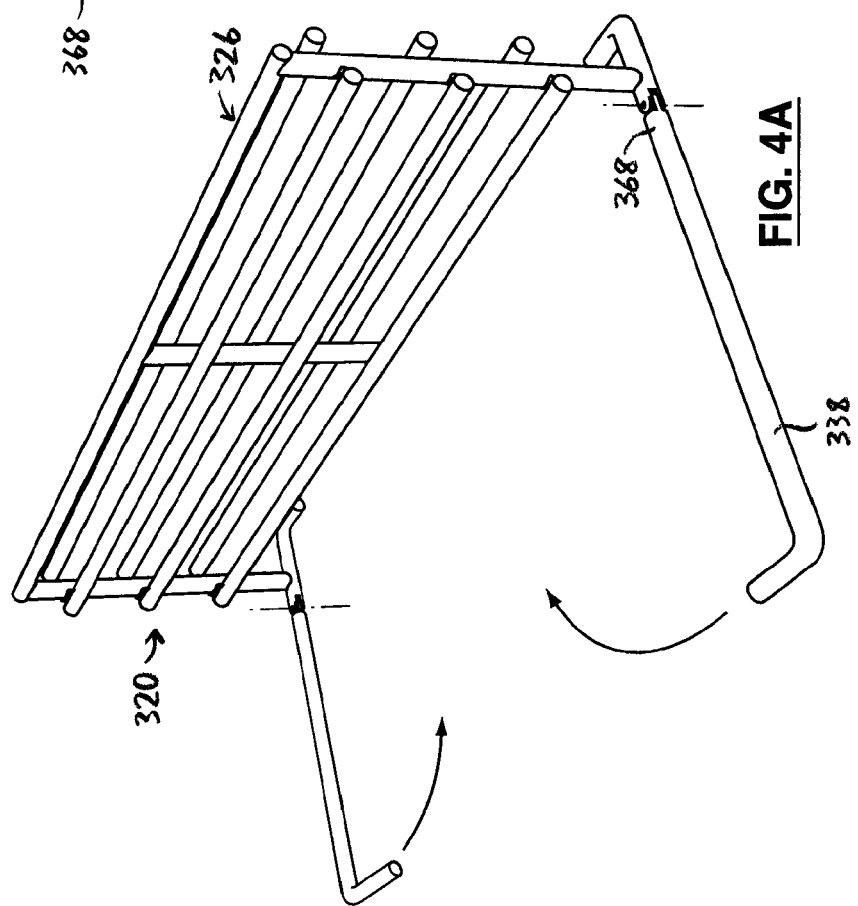
FIG. 4B
FIG. 4A

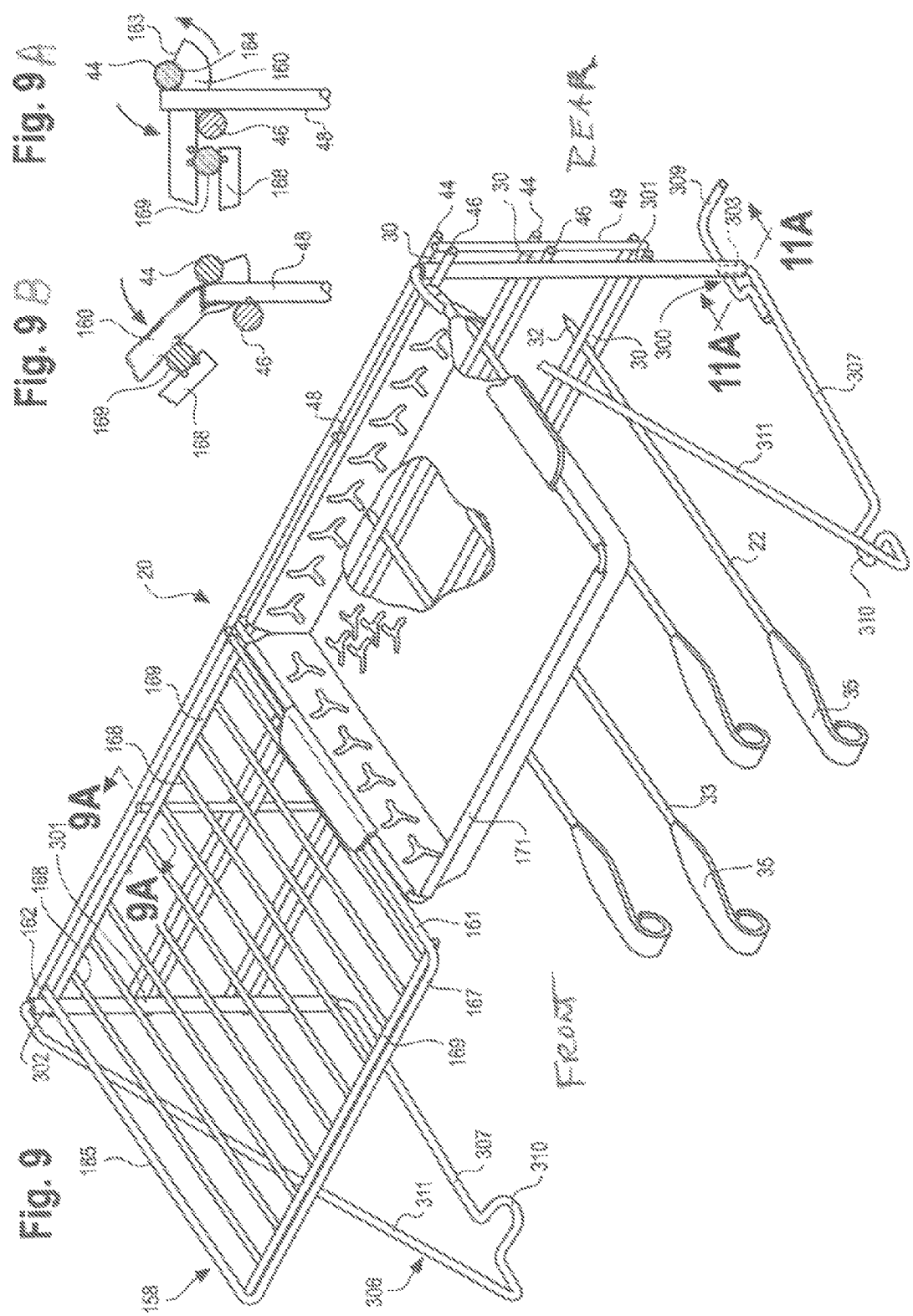

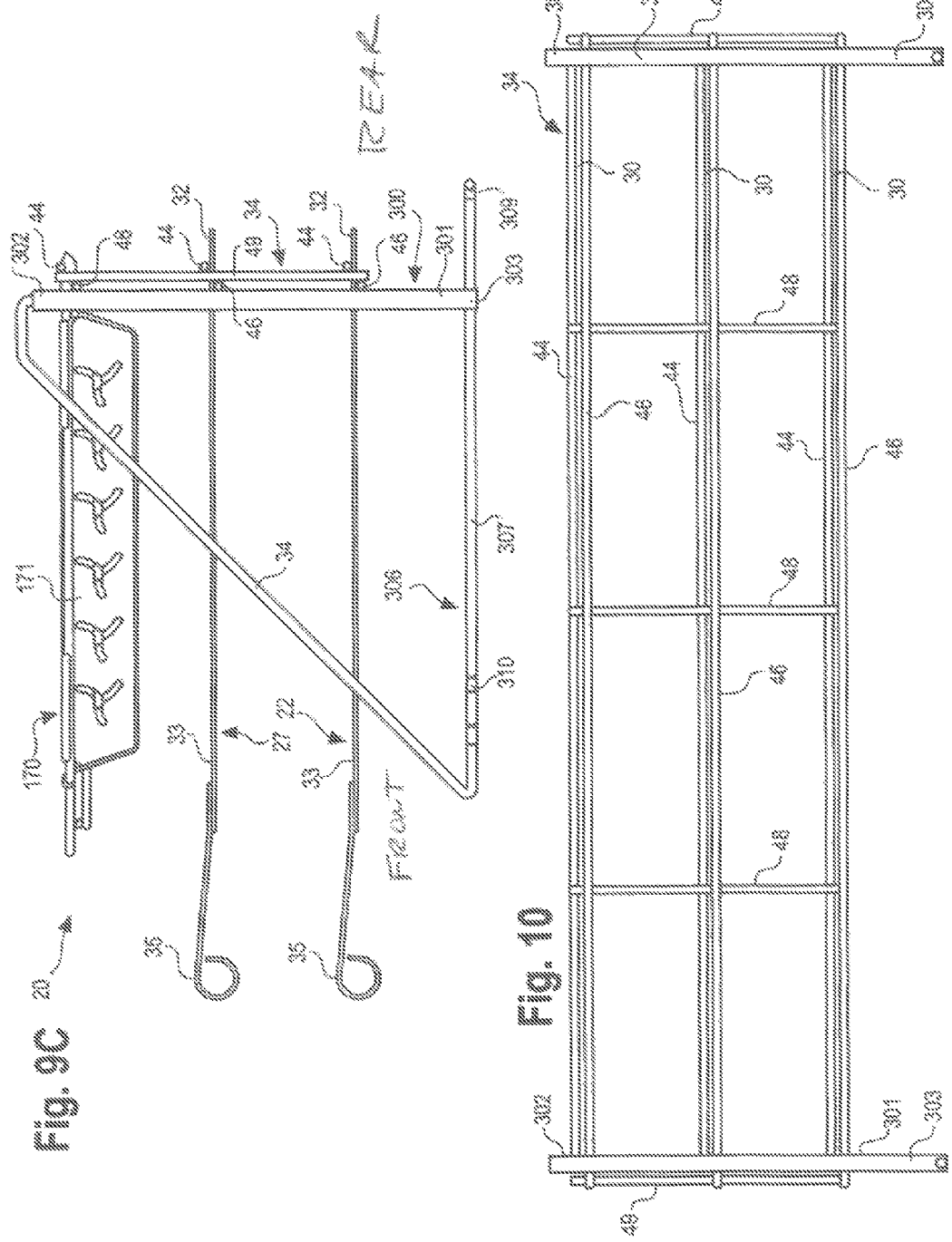

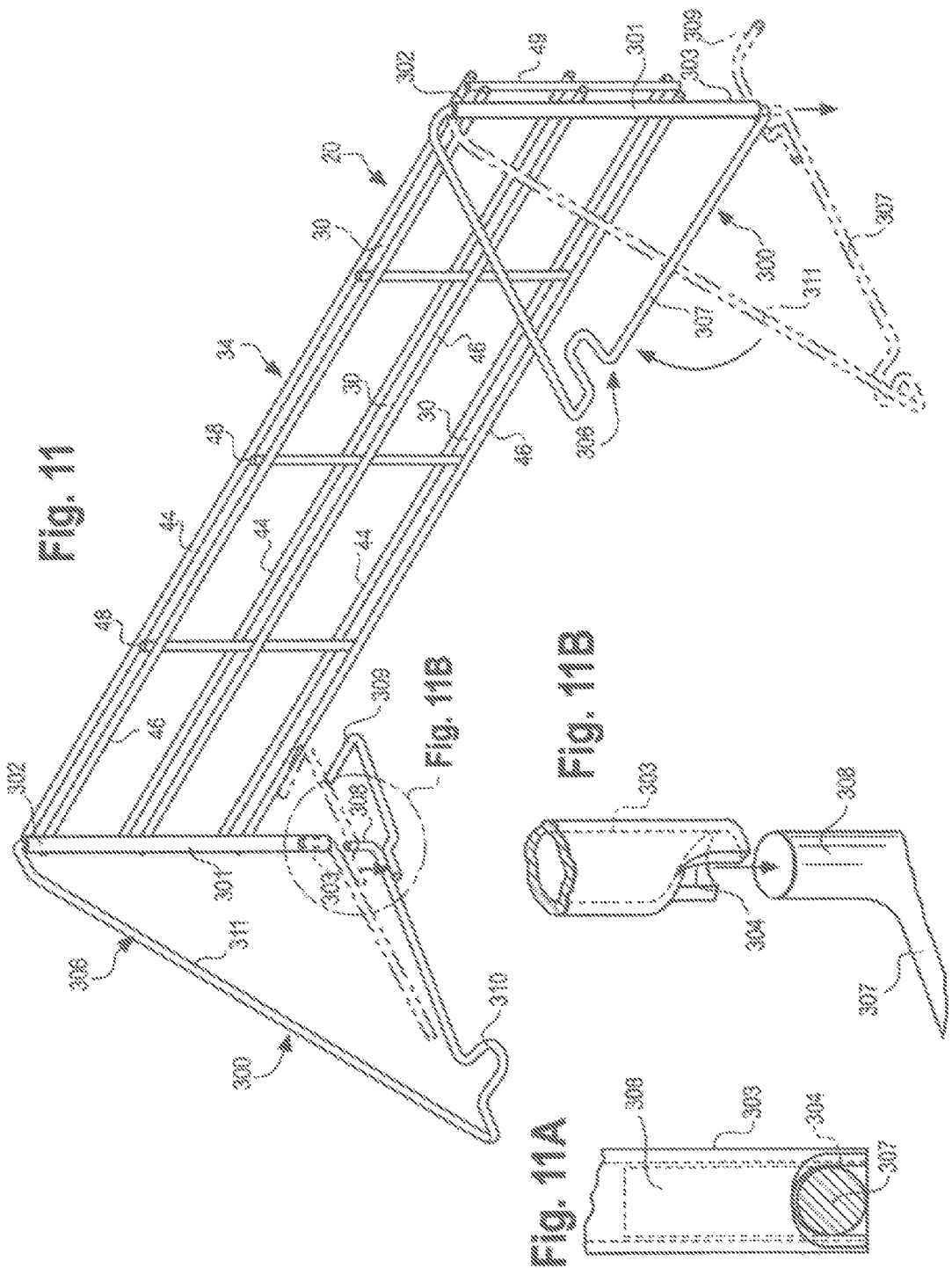

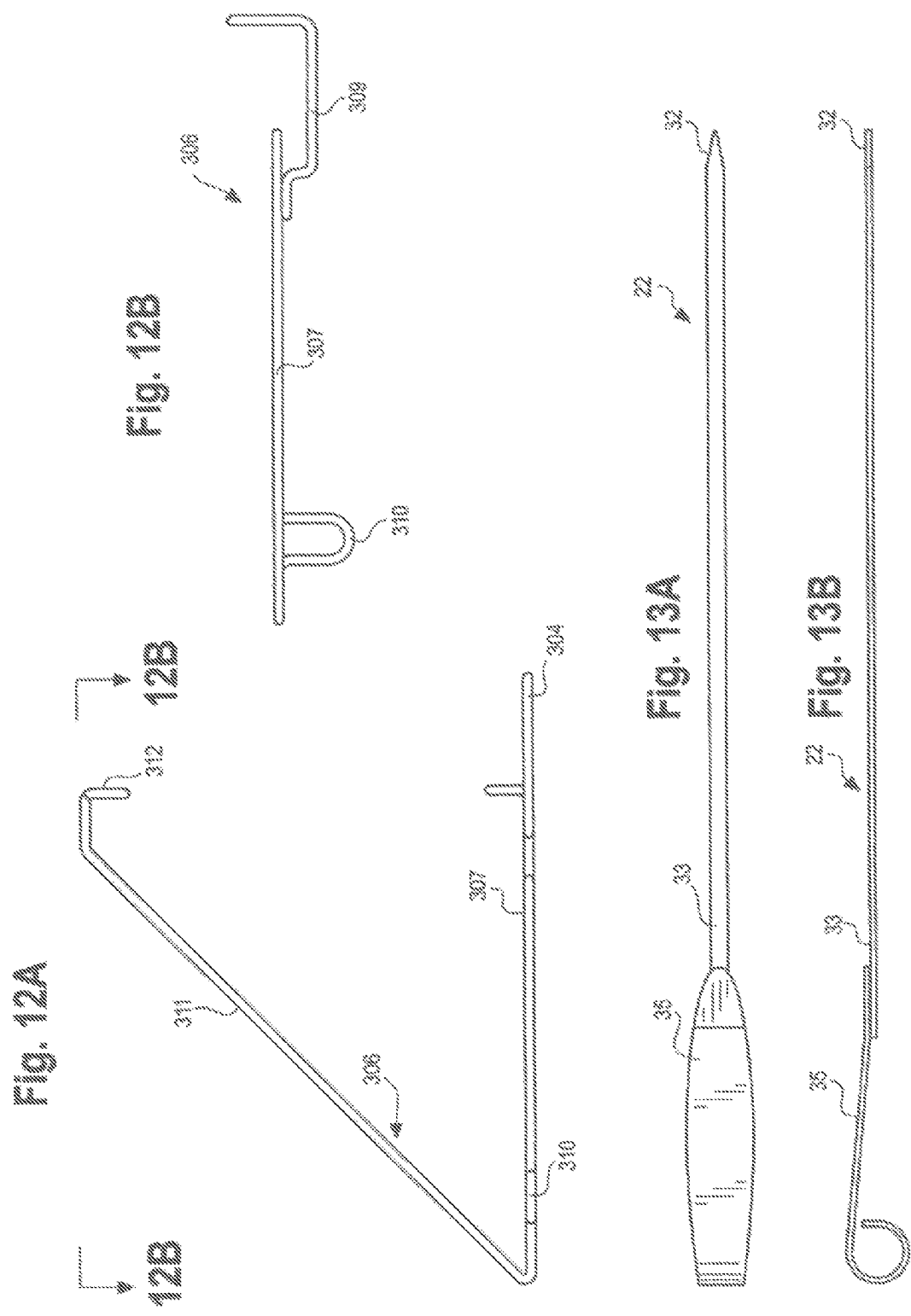

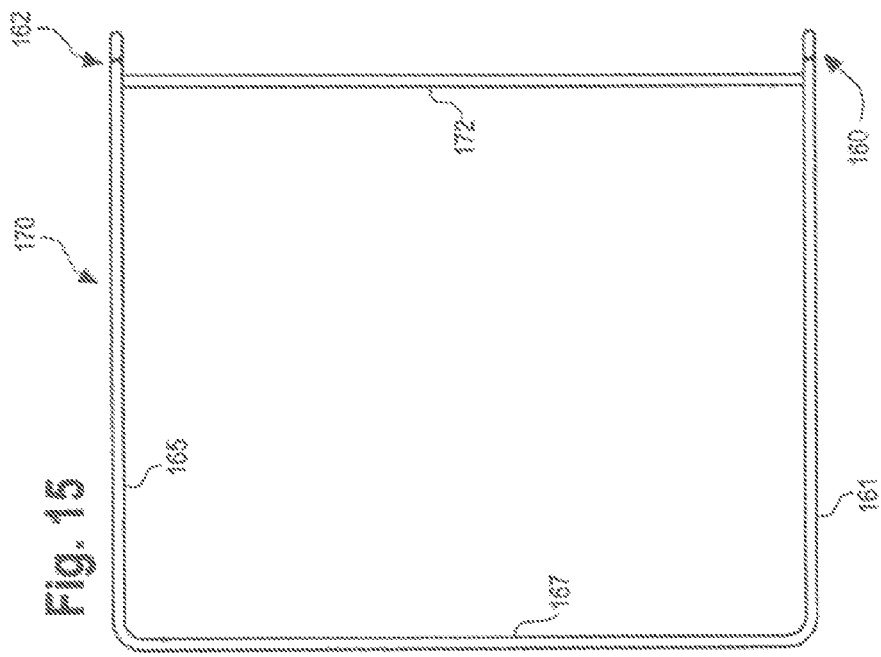
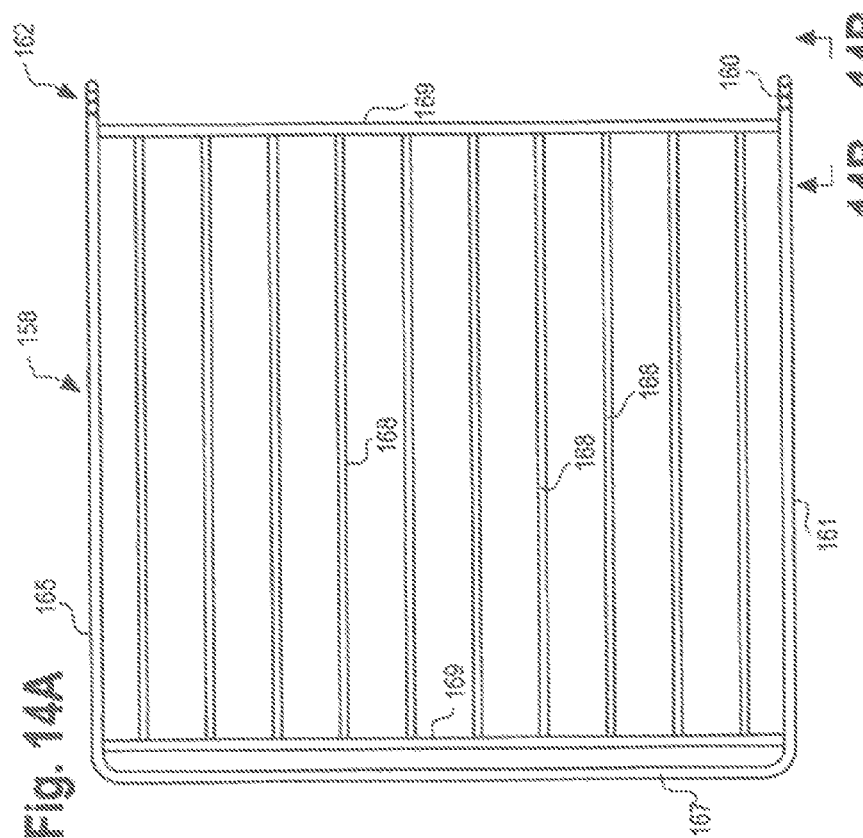
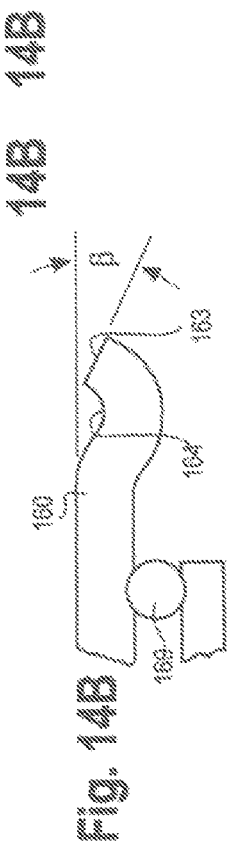

BARBECUE SUPPORT ASSEMBLY

This application is a continuation-in-part of U.S. patent application Ser. No. 12/889,891, filed on Sep. 24, 2010, which claims the benefit of U.S. Provisional Patent Application No. 61/245,775, filed Sep. 25, 2009, and claims priority to such application and provisional application and incorporates by reference in their entirety both applications.

FIELD OF THE INVENTION

The present inventions relate to a barbecue support assembly for supporting an element, accessories or food retention device (such as skewers, racks, pans and the like) or a number of such elements at one or more preselected heights above a barbecue grill.

BACKGROUND OF THE INVENTION

In typical barbecues, the grill or cooking surface is generally flat, often being defined by ribs which are spaced apart and substantially parallel. The barbecue unit also typically includes a warming rack which is positioned a distance above the grill, when the barbecue unit's hood is opened.

In conventional barbecues, the food to be cooked can be positioned therein only according to a limited number of options. For example, on the grill, the position of the food items may be changed (i.e., laterally or inwardly, or both) for exposure to more or less heat, as required. Once cooked, the food may be positioned on the warming rack, where the food is held sufficiently far away from the heat that it is warmed, with minimal further cooking thereof.

However, different types of food require different arrangements for cooking it, and the limited options available in known barbecues are sometimes inadequate. For instance, a shish kebab should be positioned relatively close to heat for cooking, but not so close as to char or blacken the food. In addition, many available accessories and food retention devices can only be used in one configuration. For example, specialized racks for cooking drumsticks or grill pans cannot be readily used at the same time other accessories are being used, such as skewers and the like.

SUMMARY OF THE INVENTION

For the foregoing reasons, there is a need for a barbecue support assembly which addresses or mitigates one or more of the disadvantages of the prior art.

In its broad aspect, the invention provides a barbecue support assembly for supporting an elongate skewer at one or more preselected heights above a barbecue grill. The barbecue support assembly includes one or more body elements with one or more parts thereof positionable substantially at the preselected height. Also, each part includes one or more apertures in which an end of the skewer is receivable.

In another aspect, each aperture extends transversely to permit the skewer to be repositioned transversely relative to the barbecue grill.

In yet another aspect, the body element comprises a number of parts positioned at a number of preselected heights above the barbecue grill.

In an alternative preferred aspect of the present inventions, a barbecue support assembly to cantilever a food retention device at a preselected height above the cooking surface of a grill is provided. It includes at least two vertical uprights horizontally spaced apart between the sides of the grill, the vertical uprights having a front side and a rear side; at least one upper transverse bar extending between the vertical uprights and attached to the rear side of the vertical uprights; at least one lower transverse bar extending between the vertical uprights and attached to the front side of the vertical uprights, the lower bar positioned vertically below the lower transverse bar; an aperture created by the vertical space between the upper and lower transverse bars; a leg assembly having a rotatable and removable leg member; and, the food retention device having at least one prong capable of insertion into the aperture such that the food retention device is cantilevered over the grill, the upper transverse bar preventing upward rotation of the prong of the food support device and the lower transverse bar supporting the prong of the food support device against downward rotation such that the food support device is cantilevered generally horizontally over the cooking surface at the preselected height. The leg assembly may also include a vertical sleeve and a leg member having a bottom insert post rotatably engaged by a lower end of the vertical sleeve and a top insert post rotatably engaged by an upper end of the vertical sleeve. The lower end of the vertical sleeve may also include a notch or other means to secure the leg member in a locked position for use. The prong of the food retention device preferably includes a hook portion and/or an offset portion that is preferably offset twenty degrees from horizontal. The food retention device may be a warming rack and/or a basket frame and basket or any other element or desired accessory.

In another alternative aspect of the present inventions, in a grill having two sides, a front, a back and a cooking surface, a barbecue support assembly to cantilever a skewer having a fixed end and a free end at a preselected height above the cooking surface of the grill is provided. Also included are at least two vertical uprights horizontally spaced apart between the sides of the grill, the vertical uprights having a front side and a rear side; at least one upper transverse bar extending between the vertical uprights and attached to the rear side of the vertical uprights; at least one lower transverse bar extending between the vertical uprights and attached to the front side of the vertical uprights, the lower bar positioned vertically below the lower transverse bar; an aperture created by the vertical space between the upper and lower transverse bars and wherein the aperture accommodates the fixed end of the skewer, the upper transverse bar preventing upward rotation of the fixed end of the skewer and the lower transverse bar preventing downward rotation of the free end of the skewer such that the skewer is supported generally horizontally over the cooking surface. A leg assembly having a rotatable and removable leg member, which may include a vertical sleeve and the leg member may further include a bottom insert post engaged by a lower end of the vertical sleeve and a top insert post engaged by an upper end of the vertical sleeve is also provided. The lower end of the vertical sleeve may also include a notch to secure the leg member in a locked position for use.

In yet another alternative aspect of the present inventions, a barbecue support assembly to support a skewer or other food retention device or element at a preselected height above a grill is provided. The skewer or other cooking device is cantilevered over a cooking surface of the grill and includes at least two horizontally spaced apart vertical sleeves; at least one upper transverse bar extending between the two vertical sleeves and attached to a rear side of the sleeves; at least one lower transverse bar extending between the at least two vertical sleeves and attached to a front side of the vertical sleeves below the upper transverse bar; a leg member rotatably and removably secured to each of the vertical sleeves; and, wherein an aperture is created by the vertical gap between the upper and lower transverse bars to accommodate an end of the skewer or a prong of a food support device, the upper and lower transverse bars supporting the skewer or food support device cantilevered above the cooking surface of the grill at the preselected height(s). Accordingly, it is an object of the present inventions to provide a barbecue support assembly that can support food on a variety of food retention devices or accessories, individually or simultaneously, at a variety of preselected heights above the cooking surface of the grill.

It is another object of the present inventions to provide a barbecue support assembly that can simultaneously support food using a variety of food support accessories, including skewers, warming racks and cooking trays at a variety of preselected heights above a grill.

It is a further object of the present inventions to provide a barbecue support assembly that has removable and/or rotatable legs for ease of shipping, assembly and cleaning.

It is an additional object of the present invention to provide a barbecue support assembly to support the desired accessory cantilevered over the cooking surface.

It is still another object of the present inventions to enable a variety of cooking accessories, such as skewers, warming racks and cooking trays to be used individually or simultaneously.

Still a further object of the present inventions is to provide a barbecue support assembly that multiplies the cooking area of a grill by enabling the vertical support of various accessories over the grill.

These and other stated and unstated features, objects and advantages of the present inventions may be seen by reference to the drawings and description.

BRIEF DESCRIPTION OF THE DRAWINGS

The inventions will be better understood with reference to the attached drawings, in which:

FIG. 4A is an isometric view of another embodiment of the barbecue support assembly of the invention, with hinged legs thereof in an open condition;

FIG. 4B is an isometric view of the barbecue support assembly of FIG. 4A with the hinged legs thereof in a closed condition;

FIG. 9 is an isometric view of a preferred alternative embodiment of the barbecue support assembly of the present inventions shown supporting exemplary accessories or food retention devices, namely skewers, a warming rack and a cooking tray;

FIG. 9A is a detailed view taken along line 9A of FIG. 9 showing one prong of a cooking tray frame or a cooking rack fully inserted into the apertures created by the vertical spacing of an upper (rear) transverse bar and a lower (front) transverse bar in the food supporting position;

FIG. 9B shows the prong of FIG. 9A device being inserted into the aperture;

FIG. 9C is a right side view of the preferred barbecue support assembly of FIG. 9;

FIG. 10 is a front view of a preferred frame assembly of the preferred alternative embodiment of FIG. 9;

FIG. 11 is an isometric view of the alternative preferred barbecue support assembly of FIG. 9 without the food retention devices, showing the details of a preferred removable and rotatable leg assembly, with the right leg member rotated inward and the right leg member also shown in a locked position in dotted line;

FIG. 11A is an isometric view of a detail of the lower end of a vertical sleeve of the leg assembly of FIG. 11 showing details of a preferred notch and also showing a preferred bottom insert post of a leg member engaged therein in a locked position;

FIG. 11B is a front view of details of the bottom insert post of the lower leg being inserted into the lower end of the vertical sleeve of FIG. 11

FIG. 12A is a side view of a preferred leg member of the preferred leg assembly of the present inventions;

FIG. 12B is a top view of a preferred leg member of the preferred leg assembly of the present inventions taken along line 12B;

FIG. 13A is a top view of a preferred skewer element or food retention device for use in the present inventions;

FIG. 13B is a side view of the preferred skewer of FIG. 13A;

FIG. 14A is a top view of a preferred warming rack, drumstick cooker or the like of the present inventions;

FIG. 14B is a detailed view of a preferred prong of the warming rack or cooking tray frame of the present inventions showing the angle of offset;

FIG. 15 is a top view of a preferred cooking tray frame of the present inventions for use with a cooking tray.

DETAILED DESCRIPTION

Figure 1A:
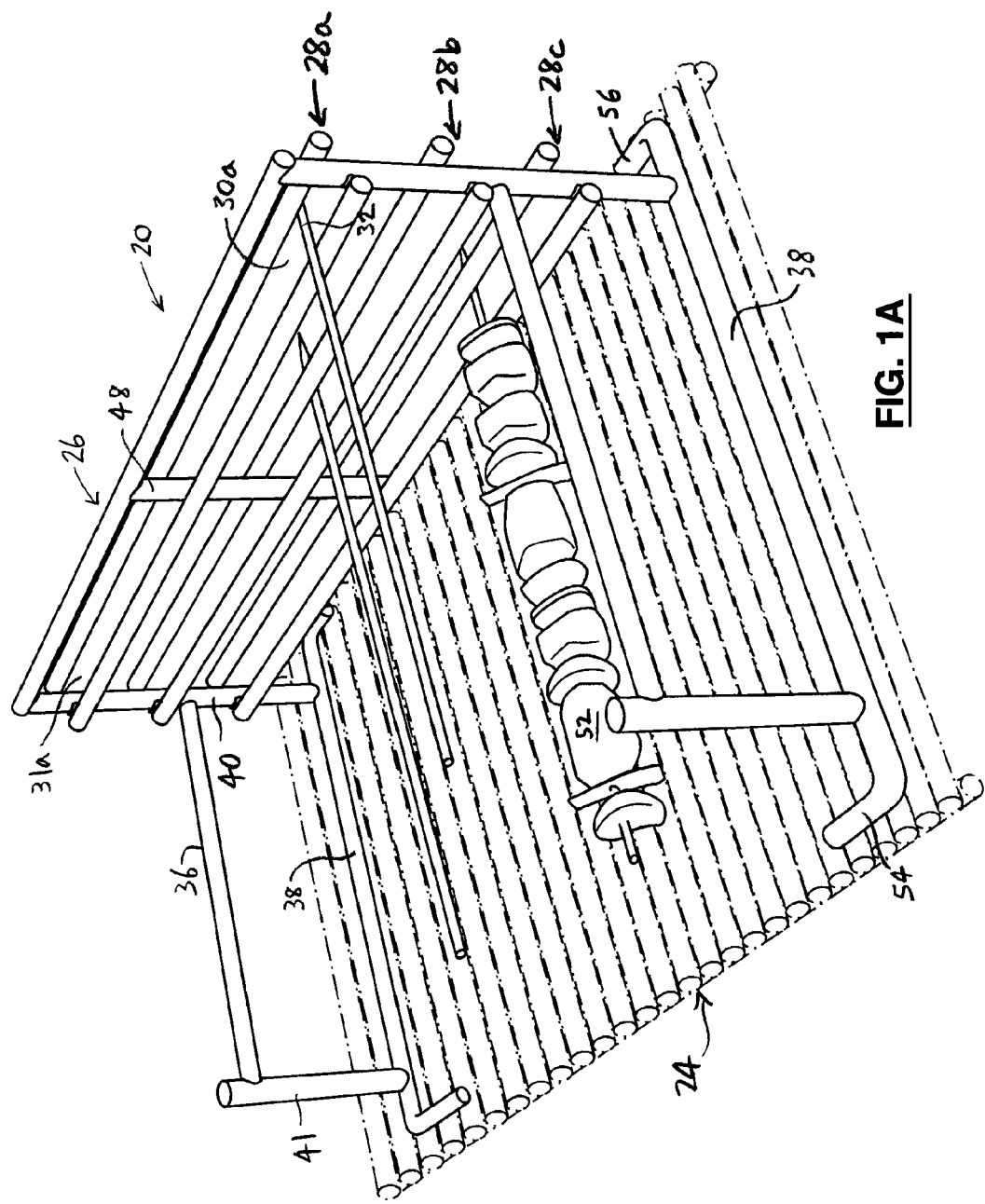
FIG. 1A is an isometric view of an embodiment of the barbecue support assembly of the invention.
Figure 1B:
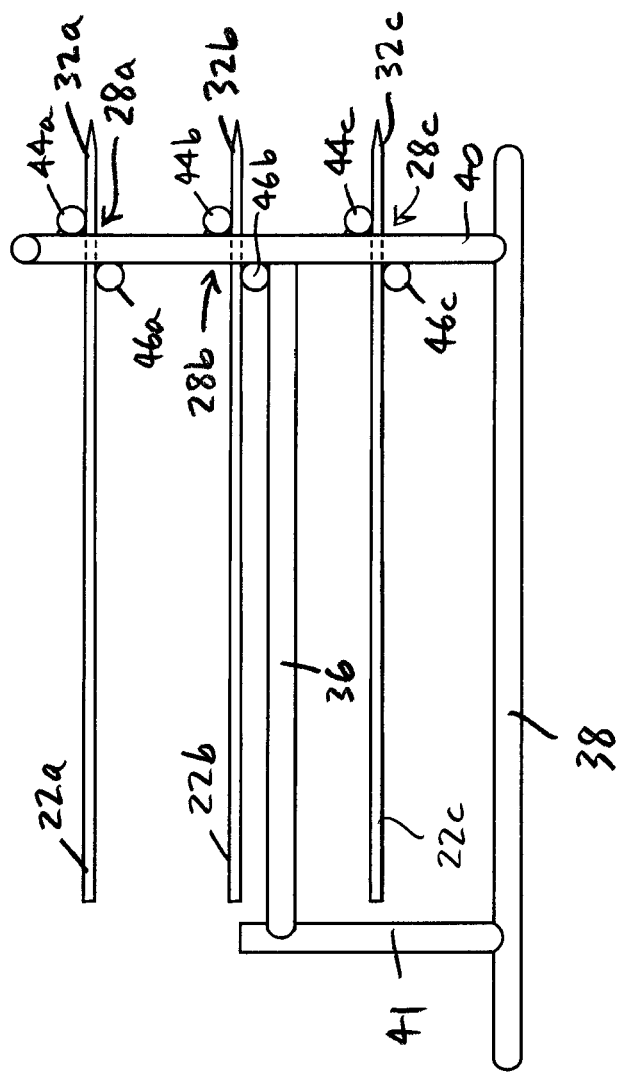
FIG. 1B is a side view of the barbecue support assembly of FIG. 1A.

Reference is first made to FIGS. 1A and 1B to describe an embodiment of a barbecue support assembly in accordance with the invention indicated generally by the numeral 20. The barbecue support assembly 20 is for supporting an elongate skewer 22 at one or more preselected heights above a barbecue grill 24 (FIGS. 1A and 1B; 224, FIG. 2D). Preferably, the barbecue support assembly 20 includes one or more body elements 26 with one or more parts 28 thereof positionable substantially at the preselected heights above the grill 24, as will be described. As can be seen in FIG. 1A, each part 28 preferably includes one or more apertures 30 in which an end 32 of the skewer 22 is receivable.

In one embodiment, the barbecue support assembly 20 preferably includes a frame 34 for supporting the body element 26 above the grill 24. The frame 34 preferably includes upper and lower legs 36, 38, and inner and outer uprights 40, 41. Preferably, the upper and lower legs 36, 38 are attached to the inner and outer uprights 40, 41, and the parts 28 are also connected to the inner uprights 40. As can be seen in FIG. 1A, each part 28 preferably includes first and second portions 44, 46. Other embodiments include hinged legs (see FIGS. 4A and 4B) and the preferred removable and/or rotatable leg assembly 300 (see FIGS. 9 and 11).

For ease of identification, three parts 28a, 28b, and 28c are identified in FIGS. 1A and 1B. It will be understood that, in the embodiment shown in FIGS. 1A and 1B, the first and second portions 44, 46 in each part 28 are the upper and lower bars respectively which define apertures therebetween. These components are also referred to herein, and particularly with respect to the alternative preferred embodiments, as front or lower transverse bar 46 and rear or upper bar 44. In addition, the barbecue support assembly 20 preferably includes an intermediate upright 48, to provide structural strength. Intermediate uprights 48 also provide horizontal spacing of transverse bars 44, 46 that help permit the cantilever support over grill 24 as described. For clarity, the apertures on both sides of the optional intermediate upright 48 are identified as apertures 30, 31 respectively (FIG. 1A). In the alternative preferred embodiment, the apertures are simply referred to as 30. For example, in the part 28a, the first and second portions 44a, 46a are the upper and lower bars defining the apertures 30a, 31a therebetween. The apertures 30 and 31 are created by the vertically offset placement of upper transverse bar 44 and lower transverse bar 46 (see e.g., FIGS. 9 and 10).

Those skilled in the art will appreciate that the barbecue support assembly 20 may be formed of a variety of materials, which may be attached together or otherwise made into the barbecue support assembly 20 in various ways. For example, the body element may be a substantially solid sheet of material with apertures therein (for receiving the ends of the skewers) spaced apart to provide the desired horizontal and vertical spacing from each other, when the body element is in the operational (i.e., substantially vertical) position.

As another example, and as illustrated in FIG. 1A, the barbecue support assembly may be made of steel bars, welded or otherwise secured together. It has been found that steel bars approximately ¼ inch in diameter are suitable for the horizontal members, and steel bars approximately 7/16 inch in diameter are suitable for the vertical members.

Figure 3:
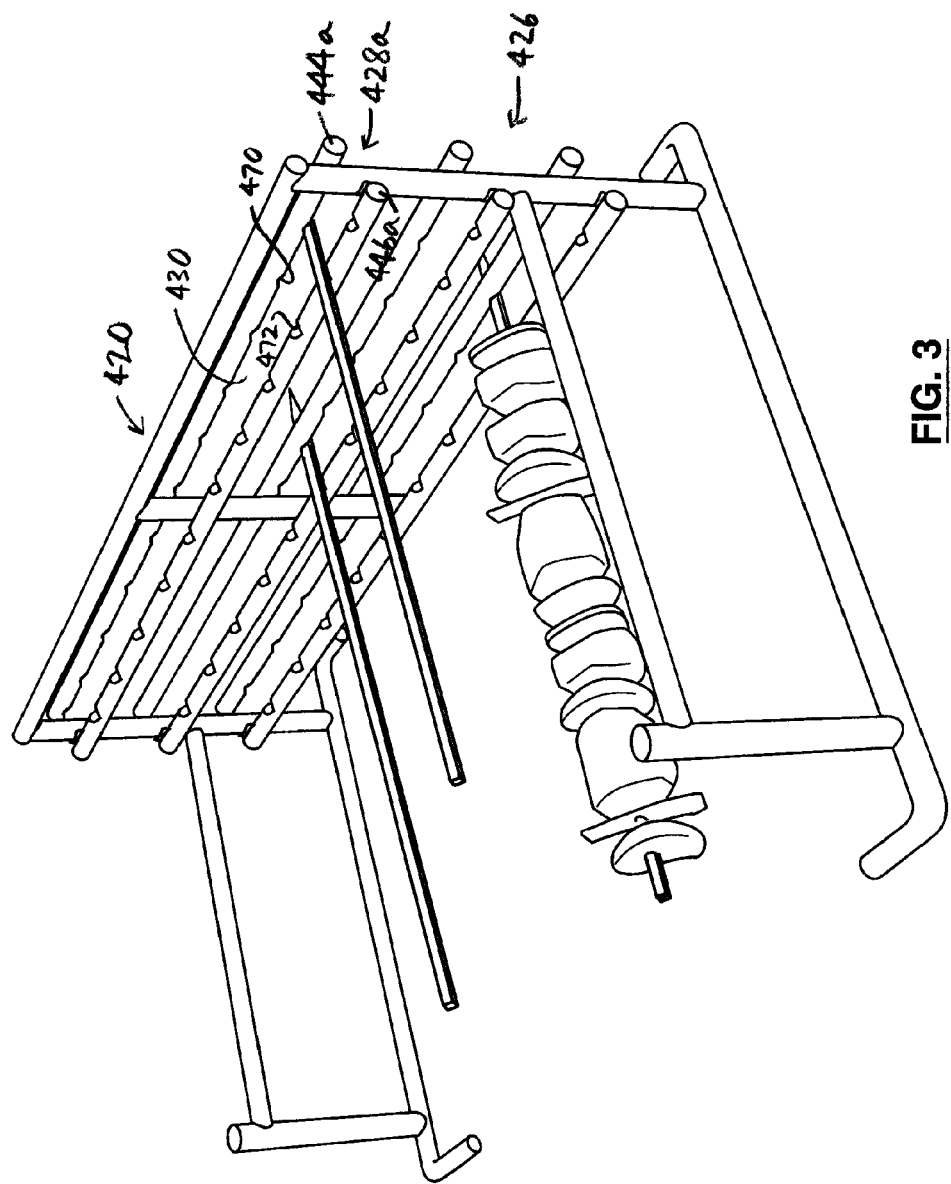
FIG. 3 is an isometric view of another alternative embodiment of the barbecue support assembly of the invention.

In the embodiment illustrated in FIGS. 1A and 1B, the upper and lower bars 44a, 46a (and also the corresponding upper and lower bars of the parts 28b, 28c) preferably are vertically offset relative to each other. In particular, the upper and lower bars 44, 46 of each part 28 are positioned on opposite sides of the upright members 40, as well as any intermediate uprights 48. As can be seen in FIG. 1B, the skewer 22 preferably is inserted above the lower bar 46a, but below the lower bar 44a. Because the upper and lower bars 44, 46 are offset, the end of the skewer 32 is securely held in the aperture as more fully discussed below. The vertical distance between the upper and lower bars is sufficient to enable a user (not shown) to position the end 32 of the skewer therebetween relatively easily. It has been determined, however, that minimizing the size of aperture 30 provides more support and stability, particularly for a skewer 22. Thus, as hereafter described, a flat skewer, as shown in FIGS. 13A and 13B, is preferred. In other embodiments, notches 470, 472 (FIG. 3) or other means may be incorporated to secure and stabilize skewer 22 (see FIGS. 5A, 5B and 5C).

In use, the user inserts the end 32 of the skewer 22 into the aperture 30. In FIG. 1A, the skewers inserted into apertures in the parts 28a, 28b, and 28c are identified as 22a, 22b, and 22c respectively for clarity. (Food 52 is shown only on the skewer 22c, to simplify the illustration. It will be understood that food preferably is also present on the skewers 22a and 22b when they are in use.) When the end 32a of the skewer 22a is inserted into one of the apertures 30a, 31a, food 52 on the skewer 22a is held at a first preselected height above the grill 24.

Similarly, when the respective ends 32b, 32c of the skewers 22b, 22c are inserted into apertures 30b, 30c, the food on the skewers 22b, 22c is held at second and third preselected heights above the grill respectively. The skewers may be positioned and repositioned vertically as required for cooking the food thereon.

Preferably, and as can be seen in FIG. 1A, each aperture 30, 31 extends transversely (i.e., generally across the width) relative to the barbecue grill 24. For instance, the user may move the skewer 22a to the right or left (as presented in FIG. 1A), with the end 32a thereof in the aperture 30a or the aperture 31a, as the case may be, in order to expose the food thereon to less or to more heat, as required by the user. Alternatively, the user may move the skewer transversely (i.e., along the width of the grill 24) in order to allow the user to have easy access to another food item (not shown) on the grill 24 or to use other elements or accessories.

As noted above, vertical movement of the skewer relative to the grill 24 is possible. The parts 28a, 28b, and 28c are positioned at a number of preselected heights respectively, to permit the skewers to be repositioned vertically by the user, as desired. Accordingly, the positioning of the parts 28 vertically relative to each other and the grill (i.e., when the assembly 20 is positioned on the grill) permits the user to reposition skewers vertically, as the user requires. For example, after a skewer has been positioned in a lower part and the food thereon has been cooked, the user may wish to move the skewer to a higher part, so that the food thereon is only warmed.

Preferably, the lower leg 38 includes one or more transverse portions 54, 56 which are positionable transverse to the ribs of the barbecue grill 24, to stabilize the support assembly 20. The configuration of the barbecue support assembly 20 illustrated in FIG. 1A is advantageous because it can be used in an existing barbecue unit.

From the foregoing, it can be seen that the invention provides for multi-level cooking simultaneously, which effectively multiplies the available cooking area. Also, food items may be cooked (e.g., while on a skewer) without the food item touching a hot cooking surface (e.g., the grill), so that fatty foods (e.g., chicken wings), are less likely to be charred, or burst into flames while cooking. Also, less cleaning is required, as only the skewer needs to be cleaned after use. Flare-ups from the heat source generally have minimal effect on the cooking, because the food is positioned at a height above the grill surface. The skewers preferably are relatively easy to rotate, and the invention may be used with virtually any skewer.

Additional embodiments of the invention are shown in FIGS. 2A-8. In FIGS. 2A-8, elements are numbered in multiples of a hundred so as to correspond to like elements in FIGS. 1A and 1B. And, further alternative preferred embodiments are shown in FIGS. 9-15.

Figure 2A:
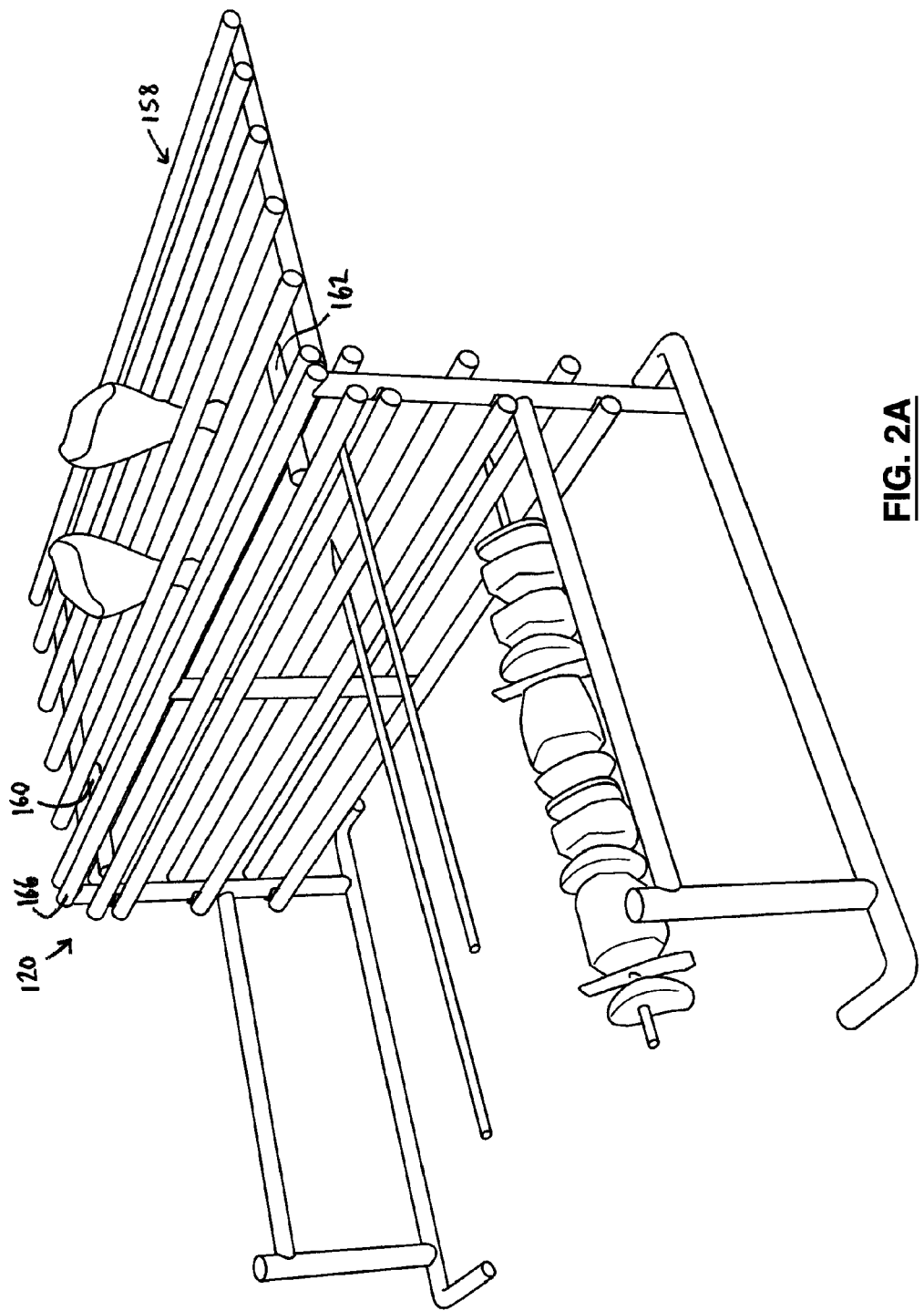
FIG. 2A is an isometric view of another embodiment of the barbecue support assembly of the invention.
Figure 2B:
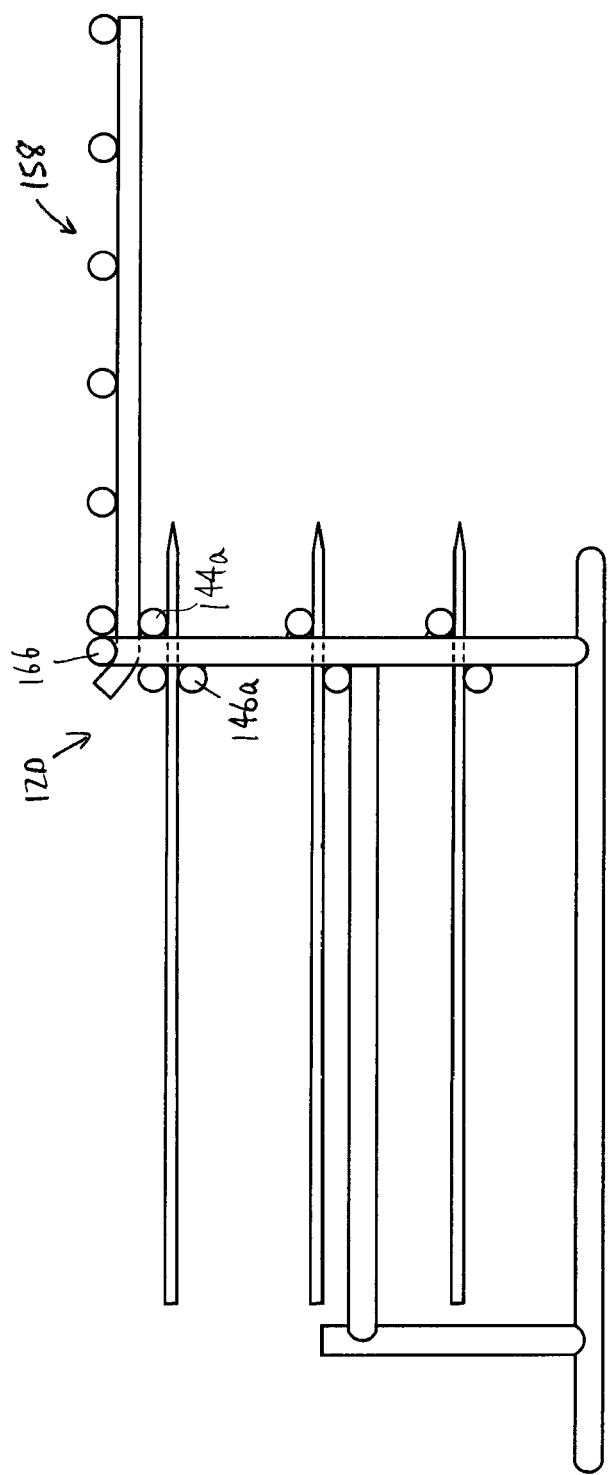
FIG. 2B is a side view of the barbecue support assembly of FIG. 2A.

Another embodiment of a barbecue support assembly 120 of the invention is shown in FIGS. 2A and 2B. The assembly 120 preferably includes a warming rack 158, which includes prongs 160, 162 receivable in a slot defined between the part 128a and an upper member 166 of the body element 126 (FIG. 2B).

Figure 2C:
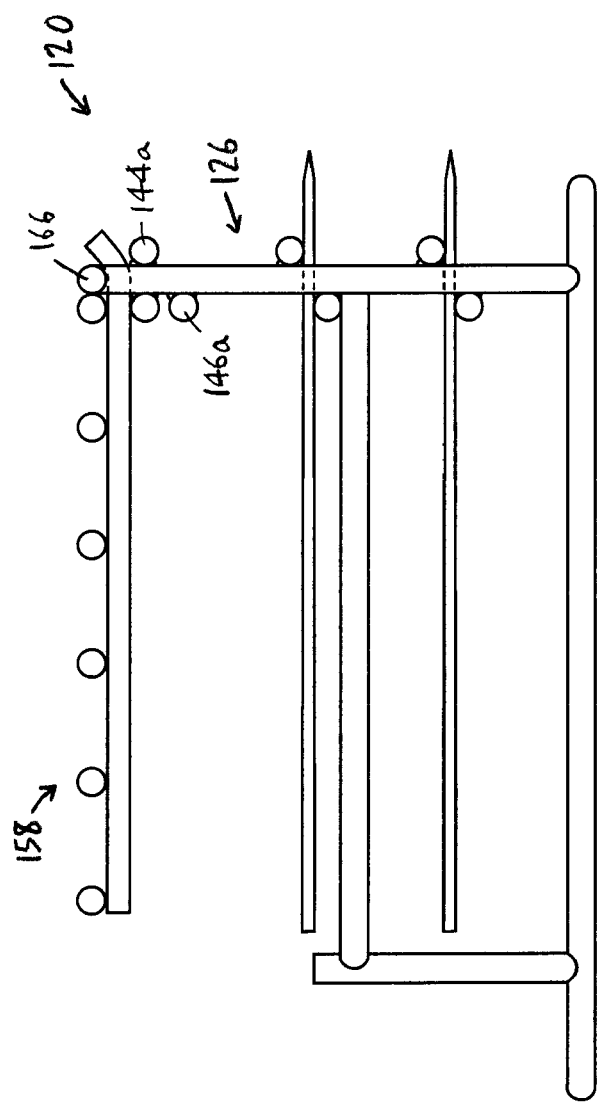
FIG. 2C is a side view of another alternative embodiment of the barbecue support assembly of the invention.
Figure 2D:
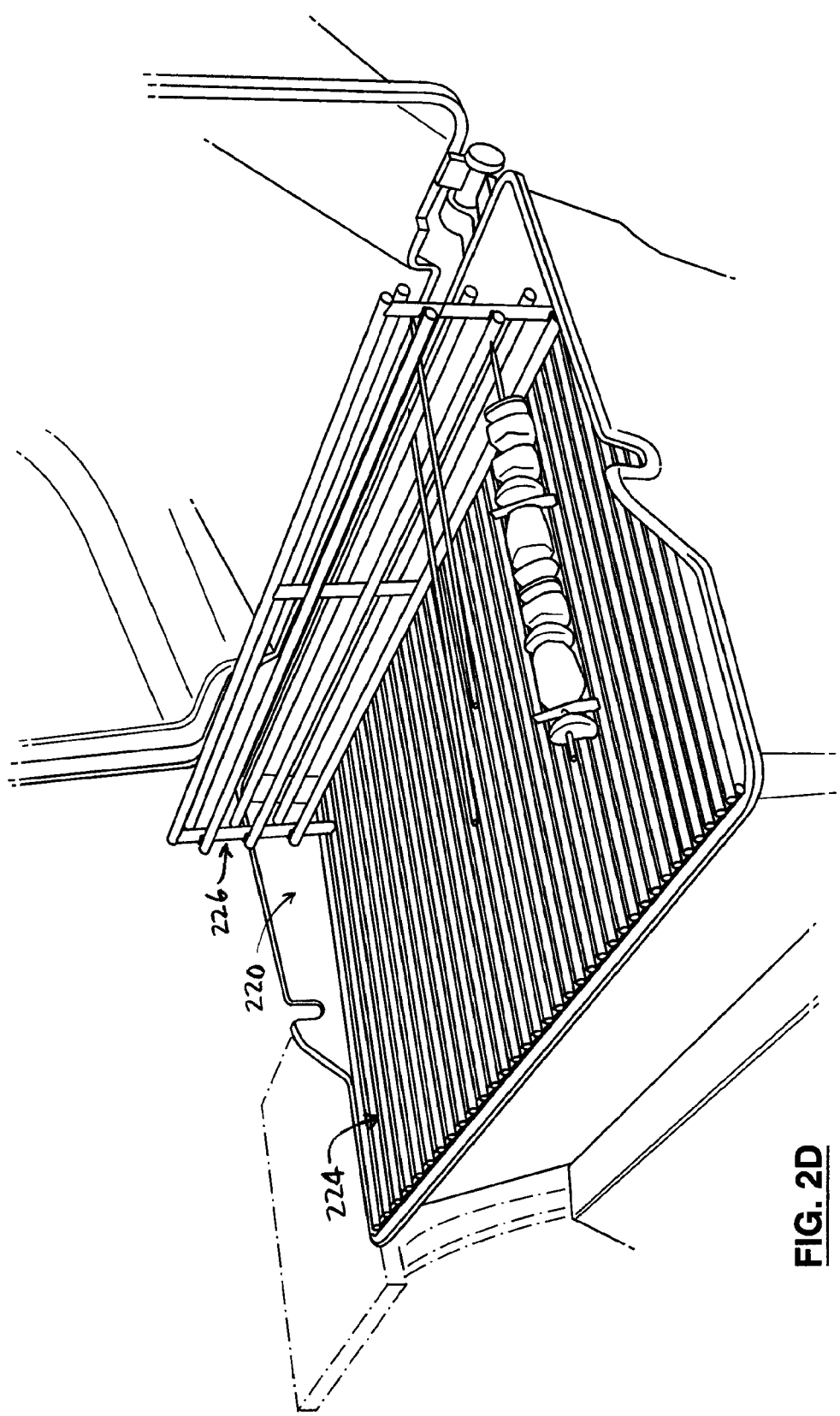
FIG. 2D is an isometric view of another embodiment of the barbecue support assembly of the invention.

In an alternative arrangement illustrated in FIG. 2C, the warming rack 158 may be positioned in front of the body element 126. The prongs 160, 162 are inserted in the slot, directed toward the inner side of the body element (i.e., from front to back), in order to support the warming rack 158 at one end and to position the warming rack 158 in front of the body element 126.

Another embodiment of the barbecue support assembly 220 is shown in FIG. 2D. In this embodiment, the body element 226 is attached to or otherwise formed with the barbecue grill 224 to form the barbecue support assembly 220.

FIGS. 4A and 4B illustrate another embodiment of the invention. The barbecue support assembly 320 preferably includes movable lower legs 338 which are pivotably mounted to the body element 326 at inner ends 368 thereof. The legs 338 preferably are movable between an open position (FIG. 4A), in which the legs 338 are positioned to support the body element 326, and a closed position (FIG. 4B), in which the legs are folded, e.g., for storage.

Various features may be included in the barbecue support assembly for holding the skewer more firmly in the aperture. In the barbecue support assembly 420 shown in FIG. 3, for instance, notches 470, 472 are formed in the first and second portions 444, 446 respectively in which the ends 32 of the skewers are receivable. Preferably, each of the notches 470, 472 is substantially aligned with another such notch to define a relatively small aperture 430 in which the end of the skewer is receivable. Because the aperture 430 is relatively small, the skewer's end fits relatively securely therein.

Figure 5A:
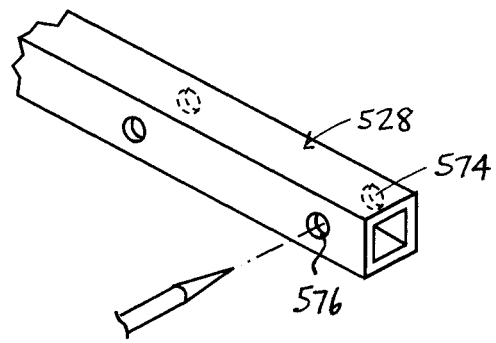
FIG. 5A is an isometric view of a portion of another embodiment of the barbecue support assembly of the invention, drawn at a larger scale.
Figure 5B:
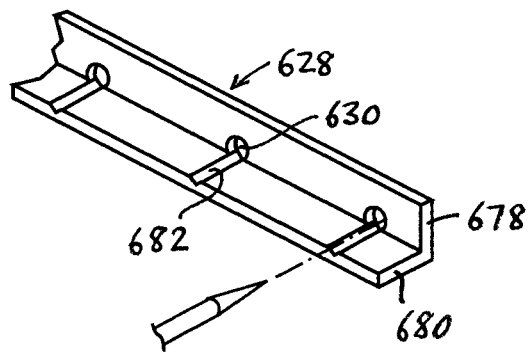
FIG. 5B is an isometric view of a portion of another embodiment of the invention.
Figure 5C:
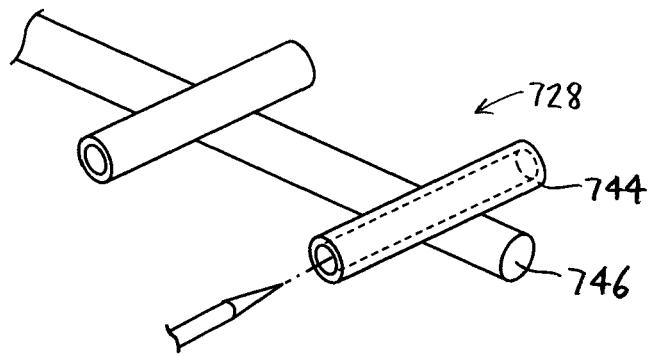
FIG. 5C is an isometric view of a portion of another embodiment of the invention.

Other embodiments are shown in FIGS. 5A-5C in which relatively small apertures are defined for receiving the end of the skewer. For instance, FIG. 5A discloses a part 528 with two apertures 574, 576 which are substantially horizontally aligned. The apertures 574, 576 are relatively small, and when the end is positioned therein, the end is held relatively securely.

FIG. 5B discloses a part 628 including a wall 678 and a flange 680. Preferably, an aperture 630 is located in the wall 678, and a groove 682 is formed in the flange 680, substantially aligned with the aperture 630, for supporting the skewer when the end is positioned in the aperture 630.

Another embodiment of the part 728 is shown in FIG. 5C. In this embodiment, the first portion 744 is mounted transversely on the second portion 746. Preferably, the first portion 744 is a tube in which the end of the skewer is receivable, so that the end is held therein relatively securely therein.

Figure 6:
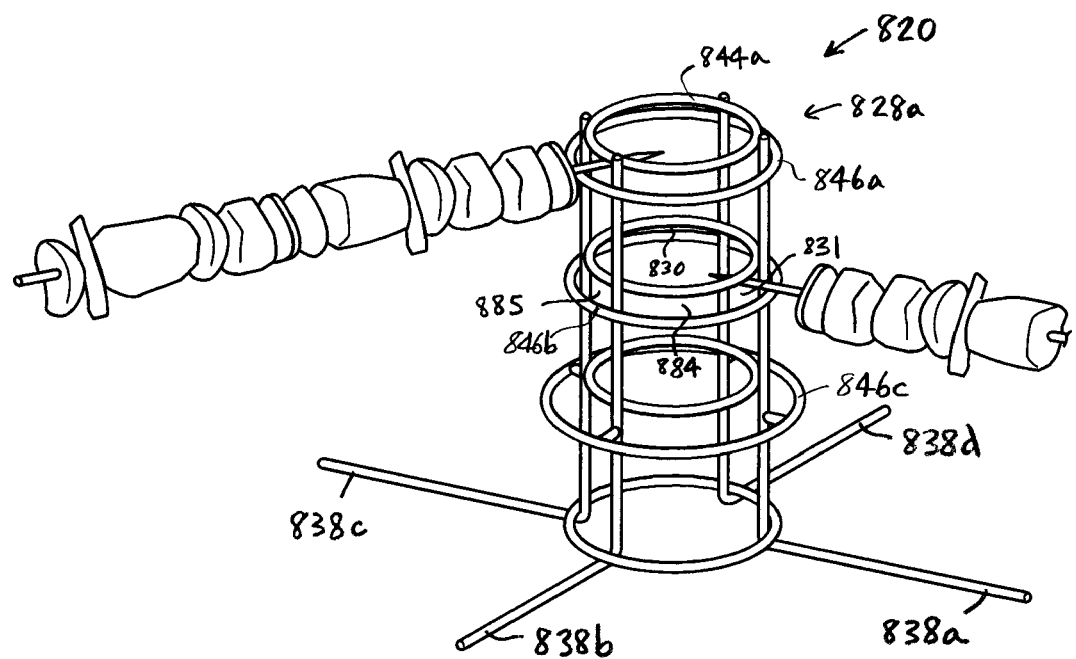
FIG. 6 is an isometric view of another embodiment of the barbecue support assembly of the invention, drawn at a smaller scale.

An alternative embodiment of the barbecue support assembly 820 is disclosed in FIG. 6. The barbecue support assembly 820 is particularly adapted for use in a kettle style barbecue unit. As can be seen in FIG. 6, legs 838a-838d support the body element 826, which includes parts 828 positioned at preselected heights above the barbecue grill (not shown). The parts 828 include first and second portions 844, 846 at least partially defining apertures 830, 831, 884, 885 in which the ends of the skewers are receivable. Those skilled in the art will appreciate that the barbecue support assembly may also be used to support food without using skewers. For example, a whole roasting chicken (not shown) may be mounted on the barbecue support assembly 820.

Figure 7:
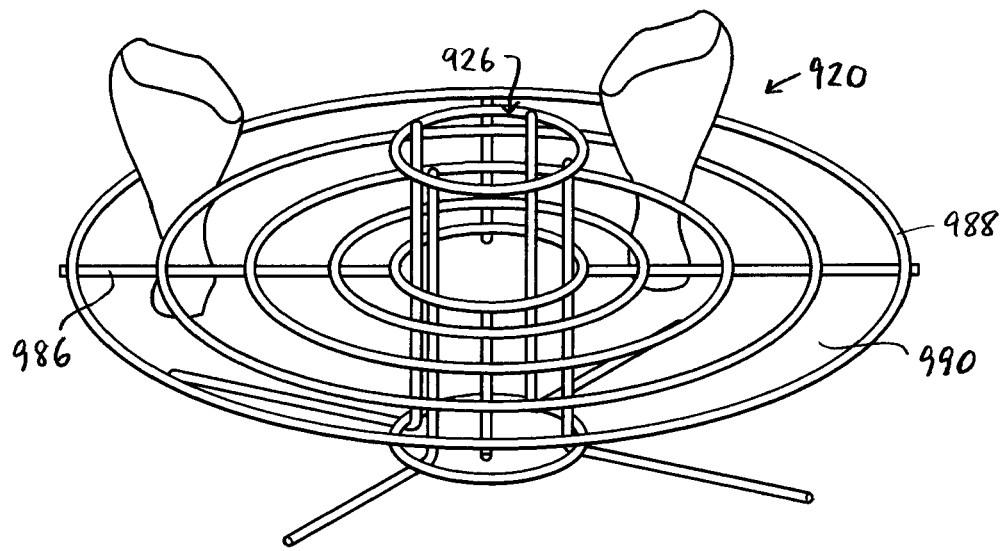
FIG. 7 is an isometric view of another alternative embodiment of the barbecue support assembly of the invention.

An alternative embodiment of the barbecue support assembly 920 is shown in FIG. 7. In this embodiment, the body element 926 and support elements 986 support concentric ring elements 988 defining spaces 990 therebetween in which the smaller end of drumsticks are receivable. Preferably, the drumsticks are positionable so that the thicker ends thereof are positioned upwardly.

Figure 8:
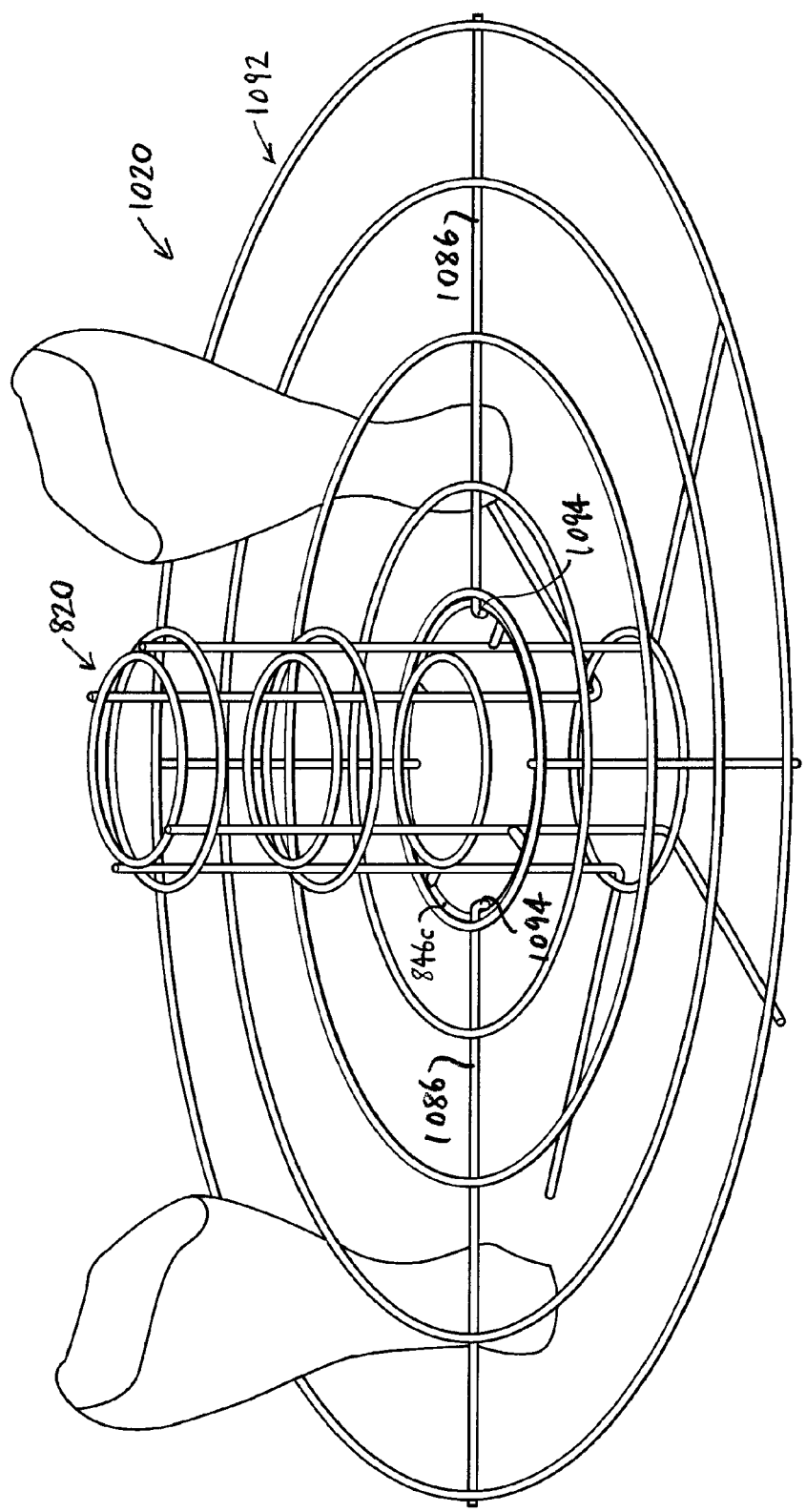
FIG. 8 is an isometric view of another embodiment of the barbecue support assembly of the invention, drawn at a larger scale.

FIG. 8 discloses a barbecue support assembly 1020 including a ring subassembly 1092 mounted on the barbecue support assembly 820. Preferably, the ring subassembly 1092 includes support elements 1086 with hook portions 1094 at inner ends thereof. The hook portions 1094 preferably are formed to engage a lowermost lower bar 846c. As can be seen in FIGS. 6 and 8, it is preferred that the lower bar 846c defines a ring with a slightly larger diameter than the rings defined by the other bars 846a, 846b in the barbecue support assembly 820. This permits the ring subassembly 1092 to be relatively easily mounted on the lowermost bar 846c. It will be understood that the ring subassembly 1092 preferably is relatively easily disengaged from the lowermost bar 846c.

Additional preferred alternative embodiments of the present inventions are shown in FIGS. 9-15. Like the other embodiments discussed herein, this preferred embodiment generally includes a barbecue support assembly 20 for placement on or attachment to a barbecue grill or cooking grate or surface of the grill 24 (shown as 224 in FIG. 2D). The support assembly includes a frame 34 and a removable and preferably rotatable leg assembly 300. Optional food retention accessories or elements which are supported at one end may include a warming rack 158 that may also be used to hold chicken drumsticks and the like, a basket frame 170 that may support a cooking basket 171, as well as elongated skewers 22. One of the advantages of the inventions is that a user may select and use a number of combination of accessories depending upon their grilling needs, as well as vertically expanding the grill's cooking area. The preferred alternative embodiment of the present invention, shown with the exemplary accessories discussed above, is shown generally in FIG. 9. The front and rear of the barbecue support assembly 20 has been labeled in FIGS. 9 and 9C for ease of reference. As will be understood by those of skill in the art, the frame 34 extends transversely across the width of the grill 24 and is typically placed toward the rear of the grill such that accessories are then cantilevered perpendicular to the frame over the cooking area towards the front of the barbecue grill. In this manner, food retention devices may be moved horizontally and/or vertically along the grill 24.

The basic preferred frame 34 of the present invention is shown in more detail in FIGS. 10 and 11. The preferred frame 34 includes a pair of outer uprights 49 (also referred to as inner frame upright 40 in FIGS. 1A and 1B). One or more intermediate uprights 48 may also be provided. It will be understood by those of skill in the art that the number of intermediate uprights 48 used, if any, depends upon the strength and size requirements of the system. It will also be understood that the spacing between the pair of opposed outer vertical uprights 49 may be selected based upon, among other things, the size of the system, the grill type for intended use and the number of accessories desired for potential simultaneous use.

Extending between the outer vertical uprights 49 is at least one pair of transverse bars, i.e., a front or lower transverse bar 46 and a rear or upper transverse bar 44. These transverse bars 44, 46 extend across the width of the grill between the vertical uprights 49. The lower transverse bar 46 in other embodiments discussed herein are referred to as lower second portions 46a, 46b and 46c, body elements 26 or parts 28. Similarly, rear or upper transverse bar 44 is referred to in other embodiments discussed herein as upper first portions 44a, 44b, 44c as well as parts 28 and body elements 26. For the description of the preferred embodiments shown in FIGS. 9-15, these components will be generally referred to as front or lower transverse bar 46 and rear or upper transverse bar 44.

As shown in FIGS. 9, 10 and 11, the preferred frame includes three pairs of upper 44 and lower 46 transverse bars. The transverse bars 44, 46 are attached to opposite sides of the outer uprights 49 and any intermediate uprights 48. More specifically, the upper transverse bar 44 is attached to the rear side of the outer uprights 49 and any intermediate uprights 48. The lower transverse bar 46 is attached to the front side of the outer uprights 49 and any intermediate uprights 48 at a position below the upper transverse bar 44. In this manner, an aperture 30 is created between the vertical space or offset between transverse bars 44, 46 to accommodate ends of skewers 32, prongs 160, 162 of a warming rack 158 or prongs 160, 162 of a basket frame 170 as hereinafter described.

It will be understood by those of skill in the art that the lower or first transverse bar 46 prevents downward rotation of the front end of a food retention device, such as the front or fixed end 33 of a skewer 22, inserted in the aperture 30 and that the rear or upper transverse bar 46 prevents upward rotation of the rear end of the device, such as the free end 32 of a skewer 22, which is then cantilevered over the cooking surface 24. It will also be understood by those of skill in the art that the size of aperture 30 is determined by the vertical distance or offset between the upper transverse bar 44 and the lower transverse bar 46 based upon the size of the device to be inserted and cantilevered. It will further be understood that any desired number of pairs of transverse bars 44, 46 may be provided at a variety of preselected heights. In this manner, the accessory or food retention device may be positioned above the cooking surface 24 at a variety of desired heights.

A preferred embodiment of the rotatable and/or removable leg assembly 300 of the present inventions may be seen by reference to FIGS. 9, 11 and 12. Leg assembly 300 includes a vertical sleeve 301 which is preferably tubular to accommodate a leg member 306 that supports frame 34 above the grill 24. Vertical sleeve 301 has an upper end 302 and a lower end 303. Lower end 303 is provided with a notch 304 that functions as hereinafter described. Vertical sleeve 301 is attached to each end of frame 34. Preferred leg member 306 includes a lower leg portion 307 having a bottom insert post 308. Lower leg 306 is also provided with a rear stabilizer 309 and a front stabilizer 310. A diagonal brace 311 interconnecting lower leg portion 307 and which terminates in a top insert post 312 are also provided. It will be understood by those of ordinary skill in the art that leg assembly 300, and particularly leg member 306, may take a variety of forms consistent with the desired ability to remove and/or rotate leg member 306 and to adequately support frame 34.

To assemble, the bottom insert post 308 is inserted into the lower end 303 of sleeve 301. The top insert post 312 is inserted into the top 302 of sleeve member 301. Notch 304 on the bottom 303 of sleeve 301 is preferably perpendicular to frame 34. In this manner, as leg 306 is rotated to a position perpendicular to frame 34, it is locked into a position to secure the frame 34 for cooking. (See FIGS. 11A and 11B.)

The preferred leg assembly 300, and particularly vertical sleeve 301, permits the leg member 306 to be rotated into a locked position. For example, as shown in FIG. 11, right leg member 306 may be rotated from a position adjacent to frame 34 into a locked position ready for use. The preferred embodiment of leg assembly 300 provides numerous advantages over fixed or even hinged legs. For example, the lower leg member 306 may be rotated inward or removed for shipping or storage. And, assembly and positioning on the grill 24 is made easier by the ability to rotate the legs 306 into a locked position within sidewalls typically found on conventional grills. It also makes cleaning easier for the user and increases longevity.

As indicated, it will be understood by those of skill in the art that leg assembly 300 may take a variety of forms consistent with the present inventions. Leg member 306 may be modified and front 310 and rear 309 stabilizers reconfigured from those shown or eliminated. Vertical sleeve 301 may be divided, for example, into two sleeve members or even eyelets, one at the top and one at the bottom, rather than a continuous tubular piece as shown. In addition, it will be understood that other configurations are contemplated. For example, vertical sleeve 301 may be used as a substitute for uprights 49. In this embodiment, upper transverse bar 44 is attached to the rear side of vertical sleeve 301 and lower transverse bar 46 is attached to the front of vertical sleeve 301. In this manner, materials may be saved while leg member 306 of leg assembly 300 is rotatable. In addition, although not preferred, leg member 306 may be configured so that it is not typically removable by the user, but rotatable from an unlocked to a locked position ready for use.

Having described the basic structure of a preferred frame 34 and its set-up with leg assembly 300, various preferred accessories will now be discussed. A preferred skewer 22 is best seen in FIGS. 13A and 13B. Skewer 22 has a fixed end 32 that typically includes a point to aid in the spearing and placement of food 52 on the skewer 22. The skewer 22 also has a free end 33 upon which a handle 35 may be attached, if desired. As shown in FIGS. 13A and 13B, skewer 22 is generally flat in the preferred embodiment, which helps to prevent food from rotating on the skewer 22. It is also more stable when cantilevered over grill 24 as hereinafter described and enables smaller apertures 30 for increased stability.

In use, food 52 is placed on skewer 22, typically over the point of fixed end 32. Fixed end 32 is then inserted into aperture 30 that is created by the vertical space between upper 44 and lower 46 transverse bars. The upper or rear transverse bar 44 prevents upward rotation of fixed end 32 and lower or front transverse bar 46 prevents downward rotation of free end 33 of skewer 22. In this manner, skewer 22 is cantilevered generally horizontally over grill 24 and is substantially perpendicular to transverse frame 34. By providing a number of pairs of upper 44 and lower 46 transverse bars at preselected heights on frame 34, skewer 22 may be moved vertically closer to or further away from grill 24 to control cooking temperature. In addition, by having a flat skewer 22, there is no need for notches 472 and the like (see FIG. 3), as discussed in some of the other embodiments.

The preferred warming rack 158 of the present invention is shown in detail in FIGS. 14 and 14A. Rack 158 includes a front frame member 167, side frame members 161 and 165, front and rear rack elements 169 and a series of food support members 168. Side member 161 terminates in a prong 160 and side member 165 terminates in a prong 162. Prongs 160 and 162 include a hook portion 164 and an offset portion 163. Prongs 160 and 162 are inserted into aperture 30 (see FIG. 9A) at a slight angle. Insertion is aided by offset portion 163, which is offset by angle B, which is preferably twenty degrees from horizontal. Hook portion 164 helps engage upper or rear transverse bar 44 as shown in FIG. 9B. In this manner, rack 158 is cantilevered over grill 24. By selecting the desired aperture 30, the height of the rack 158 above the grill 24 may be changed to control the heat. It will be understood by those of skill in the art that prongs 160 and 162 may take a variety of forms, including a straight member, and may be attached to or made part of the desired accessory.

A cooking basket 171 supported by a basket frame 170 may also be provided. As shown in FIG. 15, basket frame 170 (like rack 158) includes a front frame member 167, a rear frame member 172 and two side frame members 161 and 165. Side member 161 terminates in prong 160. Like rack 158, prong 160 has a hook portion 164 and an offset portion 163 (preferably offset twenty degrees from horizontal). Similarly, side member 165 terminates in prong 162 having a hook portion 164 and an offset portion 163. Frame 170 is cantilevered over the grill 24 when prongs 160, 162 are inserted into the desired apertures 30. A desired basket 171 (see FIG. 9) may then be placed in and supported by frame 170.

Thus, the present inventions expand the cooking area of a grill and provide increased flexibility and temperature control. In addition, a variety of accessories may also be used, either alone or in combination with other accessories. It will be appreciated by those skilled in the art that the invention can take many forms, and that such forms are within the scope of the invention as claimed. The foregoing descriptions are exemplary, and their scope should not be limited to the specific versions described therein.

We claim:

1. A barbecue support assembly to support a removable food retention device at a preselected height above a cooking surface of a grill, said food retention device having an upper surface, the barbecue support assembly comprising:
    said food retention device having a fixed end removably insertable into an aperture and a free end for holding or supporting food;
    a frame having two ends and positionable on said grill having at least two spaced apart vertical uprights, said vertical uprights having a front side and a rear side;
    at least one upper transverse bar extending between said at least two vertical uprights and attached directly to the rear side of said vertical uprights;
    at least one lower transverse bar extending between said at least two vertical uprights and attached directly to the front side of said vertical uprights, said lower bar positioned vertically below said upper transverse bar;
    wherein a space is created by a gap between said upper and lower transverse bars which create said aperture to support said food retention device at a preselected height above the cooking surface, said upper transverse bar preventing upward rotation of said fixed end of said food support device and said lower transverse bar preventing downward rotation of said free end of said food retention device such that the food retention device is cantilevered generally horizontally over said cooking surface of said grill;
    further wherein the fixed end of said food retention device includes a hook portion and an offset portion to aid in insertion of the fixed end of the food retention device into the aperture between the upper and lower transverse bars, the hook and the offset portion not projecting above said upper surface of said food retention device; and,
    a log assembly having a rotatable and removable leg member associated with each end of said frame.

2. The barbecue support assembly of claim 1 wherein said leg assembly includes a vertical sleeve.

3. The barbecue support assembly of claim 2 wherein said leg member includes a bottom insert post rotatably engaged by a lower end of said vertical sleeve and a top insert post rotatably engaged by an upper end of said vertical sleeve.

4. The barbecue support assembly of claim 3 wherein said lower end of said vertical sleeve includes a notch to secure the leg member in a locked position for use.

5. The barbecue support assembly of claim 1 wherein said offset portion is offset twenty degrees from horizontal.

6. The barbecue support assembly of claim 1 wherein the free end of said food retention device is part of a warming rack.

7. The barbecue support assembly of claim 1 wherein the free end of said food retention device is part of a basket frame.

8. A barbecue support assembly to removably support a skewer or other food retention device at plurality of preselected heights above a grill, said skewer or other food retention device having an upper surface and cantilevered substantially horizontally over a cooking surface of the grill, the barbecue support assembly comprising:
    a skewer or other food retention device having a fixed end and a free end for holding or supporting food, the fixed end including a hook portion and an offset portion, said hook and offset portions positioned below said upper surface of said skewer or other food retention device;
    a frame positionable on said grill having at least two horizontally spaced apart vertical sleeves;
    at least one upper transverse bar extending between said two vertical sleeves and attached to a rear side of said sleeves;
    at least one lower transverse bar extending between said at least two vertical sleeves and attached to a front side of said vertical sleeves vertically below said upper transverse bar;
    a leg member rotatably and removably secured to each of said vertical sleeves, each leg member extending laterally outward from the frame, wherein each leg member includes a bottom insert post engaged by a lower end of said vertical sleeve and a top insert post engaged by an upper end of said vertical sleeve, the lower end of said vertical sleeve further includes a notch to secure said leg member to said sleeve against undesired rotation; and,
    wherein an aperture is created by the vertical gap between the upper and lower transverse bars to accommodate said fixed end of said skewer or other food retention device, said upper transverse bar preventing upward rotation of said fixed end of said skewer or other food retention device and said lower transverse bar preventing downward rotation of said free end of said skewer or other food retention device, said upper and lower transverse bars supporting said skewer or other food retention device cantilevered substantially horizontally above the cooking surface of the grill at one of said preselected heights.

9. The barbecue support assembly of claim 8, wherein said offset portion is of ac twenty degrees from horizontal.

* * * * *

UNITED STATES PATENT AND TRADEMARK OFFICE
CERTIFICATE OF CORRECTION

PATENT NO.        : 9,901,211 B2
APPLICATION NO.   : 13/892636
DATED             : February 27, 2018
INVENTOR(S)       : Stephen Balcerzak et al.

It is certified that error appears in the above-identified patent and that said Letters Patent is hereby corrected as shown below:

In the Claims

Column 12, Line 1, Claim 1: "a log assembly" should read --a leg assembly--

Signed and Sealed this
Tenth Day of April, 2018

Andrei Iancu
*Director of the United States Patent and Trademark Office*